United States Patent [19]
Ozaki

[11] Patent Number: 4,593,413
[45] Date of Patent: Jun. 3, 1986

[54] SPACE-DIVERSITY RECEIVING SYSTEM

[75] Inventor: Takayuki Ozaki, Tochigi, Japan

[73] Assignee: Fujitsu Limited, Kawasaki, Japan

[21] Appl. No.: 780,244

[22] Filed: Sep. 26, 1985

Related U.S. Application Data

[63] Continuation of Ser. No. 617,581, Jun. 5, 1984, abandoned.

[30] Foreign Application Priority Data

Jun. 13, 1983 [JP] Japan ................... 58-105486

[51] Int. Cl.$^4$ ............................................. H04B 7/08
[52] U.S. Cl. ................................ 455/139; 455/276; 455/278
[58] Field of Search ................ 455/52, 65, 137–139, 455/273, 276, 278, 304, 305; 375/40, 100

[56] References Cited

U.S. PATENT DOCUMENTS

| | | | |
|---|---|---|---|
| 2,951,152 | 8/1960 | Sichak et al. | 455/139 |
| 2,979,613 | 4/1961 | Adams et al. | 455/139 |
| 3,201,692 | 8/1965 | Sichak et al. | 455/139 |
| 3,311,832 | 3/1967 | Schrader . | |
| 4,079,318 | 3/1978 | Kinoshita | 455/139 |
| 4,326,294 | 4/1982 | Okamoto et al. | 455/139 |
| 4,386,435 | 5/1983 | Ulmer et al. | 455/139 |
| 4,498,885 | 2/1985 | Namiki | 455/276 |

FOREIGN PATENT DOCUMENTS 2042307 9/1980 United Kingdom .

OTHER PUBLICATIONS

Patent Abstracts of Japan, unexamined applications, Section E, vol. 5, No. 171, Oct. 30, 1981.
Patent Abstracts of Japan, unexamined applications, Section E, vol. 5, No. 137, Aug. 29, 1981.
European Search Report, Vienna, 07-31-85.

Primary Examiner—Jin F. Ng
Attorney, Agent, or Firm—Staas & Halsey

[57] ABSTRACT

A space-diversity receiving system for microwave band radio communication including two antennas and receivers, an endless phase shifter, a hybrid combiner, a hybrid distributor, a voltage controlled oscillator, a signal mixer, a low pass filter, a detector, and a control circuit.

Microwaves received by the antennas are detected by the receivers. One received signal is directly applied to the hybrid combiner. The other received signal is applied to the hybrid combiner via the endless phase shifter. The hybrid combiner combines these signals and outputs to the hybrid distributor. The hybrid distributor distributes the amplified output to as an intermediate frequency output and a sub output. The voltage controlled oscillator generates a series of sequential frequencies based on the control of its input voltage. The signal mixer mixes the sub output with the each sequential frequency output. The detector detects the mixed signal and transmits the detected signal to the control circuit. The control circuit controls the endless phase shifter and the voltage controlled oscillator based on the deviation in the intermediate frequency band and the detection of the reception level so as to minimize the amplitude deviation of the combined IF output signal by using a microprocessor.

18 Claims, 7 Drawing Figures

SPACE-DIVERSITY RECEIVING SYSTEM

This is a continuation of co-pending application Ser. No. 617,581 filed on June, 5, 1984, now abandoned.

BACKGROUND OF THE INVENTION

1. Field of the Invention

The present invention relates to a space-diversity reception system, more particularly to a method and apparatus for space-diversity reception in microwave band communication using 16- or 64-quadrature amplitude modulation of digital microwaves. The present invention is advantageously used in transhorizon communication.

2. Description of the Prior Art

Space-diversity reception system are widely used in transhorizon microwave radio communication as they effectively reduce the effect of fading and noise due to fluctuations of electric fields, transmission distortion, and poor atmospheric conditions.

As well known by persons skilled in the art, for example, from Japanese Unexamined Patent Publication (Kokai) No. 56-72548, a space-diversity reception system comprises two parabolic antennas for receiving microwaves and reception systems for receiving the microwaves from these antennas. The microwaves received from the two antennas are combined to obtain an intermediate frequency output by the minimum amplitude deviation composition method. Part of the microwaves is also split off for control purposes.

The prior art method, however, requires the use of numerous narrow band-pass filters, for example, crystal filters or surface acoustic wave (SAW) filters, and detectors for filtering and detecting the predetermined intermediate frequency. Such narrow band-pass filters, however, are very expensive. Further, since the intermediate frequency itself and the desired bandwidth differ with each system, it is necessary to design and utilize different filters for each system, which is very troublesome.

Even with numerous narow band-pass filters, there is a problem of reduced performance of the space-diversity reception system when the fading occurs at frequencies other than those of the band-pass filters.

SUMMARY OF THE INVENTION

The primary object of the present invention is to provide a space-diversity reception system for use in transhorizon communication.

Another object of the present invention is to provide a space-diversity reception system which can effectively reduce fading at all received frequencies in microwave radio communication.

Still another object of the present invention is to provide a space-diversity reception system of a simple structure and reduced cost.

In accordance with the present invention, there is provided an apparatus for space-diversity reception in microwave band radio communication comprising at least: two receiving means for receiving microwaves transmitted from a remote transmitting station and two amplifying means connected to the receiving means for amplifying and detecting received microwaves using a predetermined detection method. Phase shifting third means is connected to one of the amplifying means for shifting a phase of a detected intermediate frequency output obtained by one of the amplifying means. Combining means is connected to the other of the amplifying the means and the phase shifting means for combining the outputs from the other of the amplifying means and the phase shifting means. Splitting means is electrically connected to the combining means for splitting the amplified output to a main output and a sub output. Generating means for generating a predetermined sequential frequency in the intermediate frequency bandwidth under the control of an input is connected to mixing means for mixing the sub output with the sequential frequency output from the generating means and for detecting the mixed signal. Controlling means for controlling the phase shifting means to minimize amplitude deviation of a combined IF output signal and to the generating means based on the detected output of the mixing means.

Moreover, in accordance with the present invention, there is provided a method for space-diversity reception in microwave band radio communication comprising the following steps. First, receiving the microwaves transmitted from a remote transmitting station by two parabolic antennas. Second, amplifying and detecting the received microwaves by two receivers using a heterodyne detection receiving method. Third, shifting a phase of a detected intermediate frequency output of one receiver by using an endless phase shifter. Fourth, combining the outputs from the endless phase shifter and the receiver by using a hybrid combiner. Fifth, splitting the output transmitted from the hybrid combiner to a main output and a sub output. Sixth, generating a predetermined sequential frequency in the intermediate frequency bandwidth by using a voltage controlled oscillator. Seventh, mixing the output signal transmitted from the hybrid combiner with the sequential frequency by using a signal mixer and detecting the mixed signal via a low pass filter by using a detector. Eighth controlling the endless phase shifter to minimize amplitude deviation of a combined IF output signal based on the output level of the detected outputs provided by the detector by using a microprocessor.

In accordance with the structure of the present invention, since it is not necessary to use many expensive filters and detectors for filtering and detecting the intermediate frequency output and it is possible to use the same equipment for different systems, it is possible to simplify the structure and reduce the cost of the system. Moreover, the optimum intermediate frequency output with an appropriate amplitude level is obtained by effective reduction of the effects of fading and noise.

DESCRIPTION OF THE PREFERRED EMBODIMENTS

Before describing the preferred embodiments, an explanation will be given of a conventional space-diversity reception system used in transhorizon communication.

Figure 1:
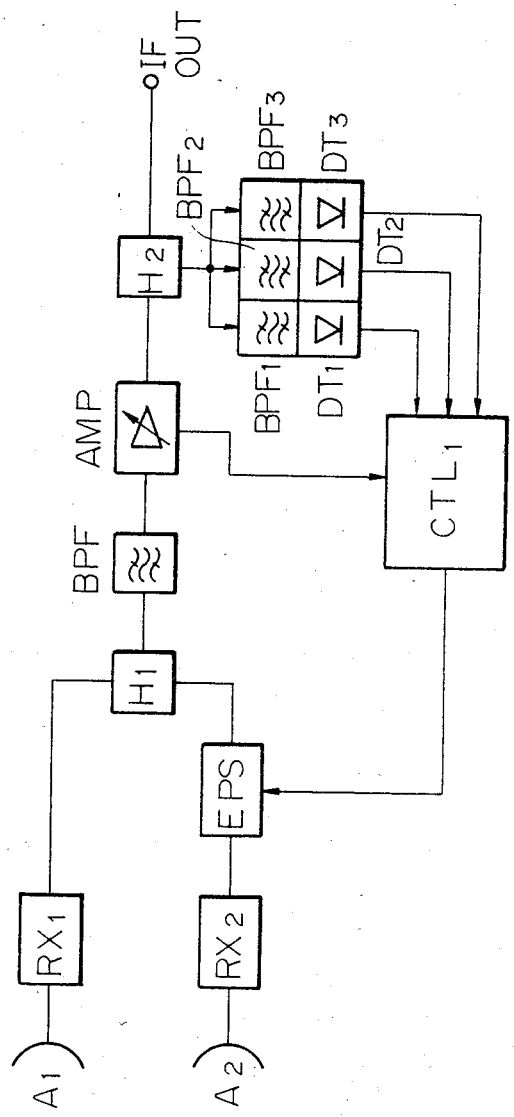
FIG. 1 is a basic circuit diagram of a conventional space-diversity reception system.

Referring to FIG. 1, a conventional space-diversity reception system comprises a main antenna $A_1$, a sub antenna $A_2$, two receivers $RX_1$ and $RX_2$, an endless phase shifter EPS, a hybrid combiner $H_1$, a band-pass filter BPF, an amplifier AMP, a hybrid distributor $H_2$; three band-pass filters $BPF_1$, $BPF_2$, and $BPF_3$; three detectors $DT_1$, $DT_2$, and $DT_3$; and a control circuit $CTL_1$.

Microwaves transmitted from a remote transmitting station, consisting of direct waves and reflected waves, are simultaneously received by the antenna $A_1$ and the antenna $A_2$. The received waves are transmitted to the receivers $RX_1$ and $RX_2$. The output of the receiver $RX_1$ is directly applied to the hybrid combiner $H_1$, while the output of the receiver $RX_2$ is applied to the hybrid combiner $H_1$ via the endless phase shifter EPS.

The hybrid combiner $H_1$ combines the output of the receiver $RX_1$ with the output of the endless phase shifter EPS. The combined output is applied to the automatic gain control amplifier AMP via the band-pass filter BPF. The output of the automatic gain control amplifier AMP is applied to the hybrid distributor $H_2$.

The hybrid distributor $H_2$ splits the output of the automatic gain control amplifier AMP into two intermediate frequency outputs, i.e., a main output and a sub output. The main output is applied to a next stage (not shown) and used for demodulation of data. The sub output is applied in parallel to each of band-pass filters $BPF_1$, $BPF_2$, and $BPF_3$. Each signal filtered by the band-pass filters $BPF_1$–$BPF_3$ is applied to a corresponding detector $DT_1$, $DT_2$, or $DT_3$. Each detector $DT_1$, $DT_2$, and $DT_3$ detects a filtered signal.

The detected signals are applied to the control circuit $CTL_1$. The control circuit $CTL_1$ controls the endless phase shifter EPS in order to control the direction of the phase shift of the received signals from the receiver $RX_2$ to reduce the deviation to minimum at the center frequency of the filtered signal.

Figure 2:
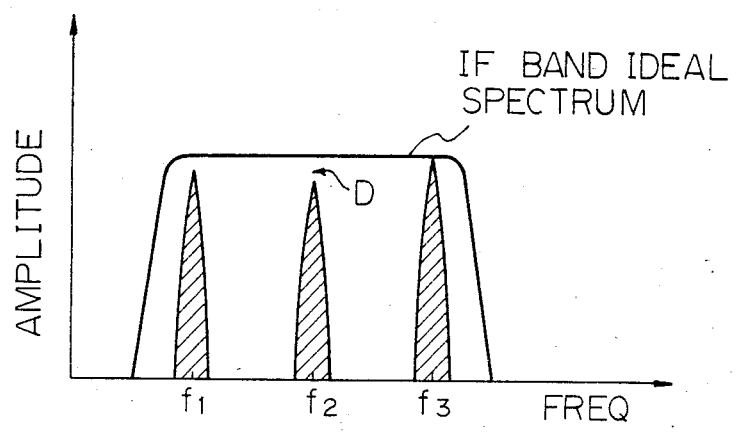
FIG. 2 is a graph for explaining deviations of amplitude of signals at frequencies selected through band-pass filters in an ideal frequency bandwidth according to the conventional system shown in FIG. 1.

Referring to FIG. 2, the ordinate indicates the amplitude of the intermediate frequency, and the abscissa indicates the intermediate frequency bandwidth. The slanted lines indicate the amplitude at each frequency passed through each band-pass filter. Reference letters $f_1$, $f_2$, and $f_3$ indicate the center frequencies of each band-pass filter, which center frequencies are selected to be low, middle, and high frequencies in the intermediate frequency bandwidth. Reference letter D indicates deviations between the intermediate frequency amplitude and the amplitude at each frequency.

When the control circuit $CTL_1$ detects a difference, i.e., deviation D, between the standard intermediate frequency amplitude indicated by the intermediate frequency bandwidth ideal spectrum curve and the actual amplitude indicated by the slanted lines in each center frequency $f_1$, $f_2$, and $f_3$, the control circuit $CTL_1$ controls the endless phase shifter EPS by the method described above. Consequently, since the endless phase shifter EPS is controlled by the control circuit $CTL_1$, the minimized amplitude deviation of the combined IF output signal is obtained by the hybrid distributor $H_2$.

However, the amplitude in the intermediate frequency bandwidth illustrated in FIG. 2 does not always increase or decrease continuously with respect to the frequency due to various external influences, mainly poor atmospheric conditions and fading. If the amplitude becomes small at a frequency between one of the filter center frequencies, the detectors cannot detect these frequency components. The control circuit $CTL_1$ therefore cannot control the endless phase shifter EPS so as to become optimum at the IF output. Accordingly, the effect of the space-diversity reception is frequently reduced by such middle frequency components in conventional space-diversity reception systems.

To solve the above problem, it is obviously possible to provide a greater number of band-pass filters and detectors within the intermediate frequency bandwidth at the stage before the control circuit. As previously explained, however, band-pass filters are very expensive and complicate individual system designs.

Figure 3:
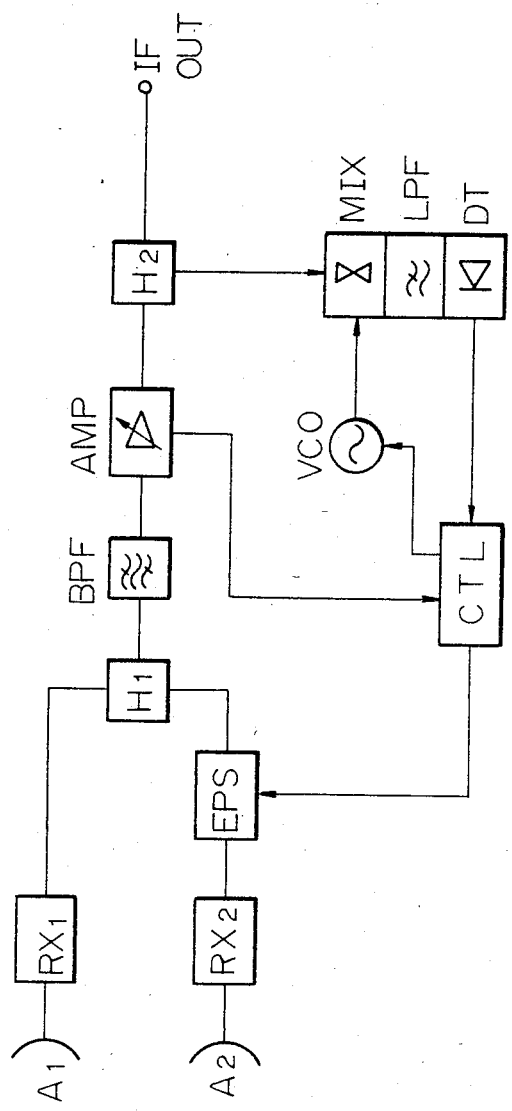
FIG. 3 is a basic circuit diagram of a space-diversity reception system according to an embodiment of the present invention.

A space-diversity reception system according to an embodiment of the present invention will now be described. Referring to FIG. 3, the space-diversity reception system according to an embodiment of present invention uses a minimum amplitude deviation composition method. The space-diversity reception system according to the present invention includes some of the same devices illustrated in FIG. 1, i.e., the antenna $A_1$, the antenna $A_2$, the two receivers $RX_1$ and $RX_2$, the endless phase shifter EPS, the hybrid combiner $H_1$, the band-pass filter BPF, the automatic gain control amplifier AMP, and the hybrid distributor $H_2$. However, a voltage controlled oscillator VCO, a signal mixer MIX, a low pass filter LPF, a detector DT, and a control cicuit CTL are provided in the system instead of the three band-pass filters $BPF_1$, $BPF_2$, and $BPF_3$, three detectors $DT_1$, $DT_2$, and $DT_3$, and the control circuit $CTL_1$.

Basically, the system operates on the detection of deviation of the received frequency spectrum in the intermediate frequency bandwidth using the minimum amplitude deviation composition method. The space-diversity reception system is controlled by this method to obtain optimum intermediate frequency output from the intermediate frequency output terminal without noise and fading.

The operation of the space-diversity reception system will now be explained in more detail. High frequency microwaves, for example, 6 GHz, transmitted from a remote transmitting station, including direct waves and reflected waves, are simultaneously received by the main parabolic antenna $A_1$ and the sub parabolic antenna $A_2$. The receivers $RX_1$ and $RX_2$ amplify the received microwaves using a low noise receiving method and detect received signals amplified in an intermediate frequency range, for example, 70 MHz, using the heterodyne detection method, i.e., the receivers $RX_1$ and $RX_2$ are heterodyne detection receiving circuits.

Figure 6:
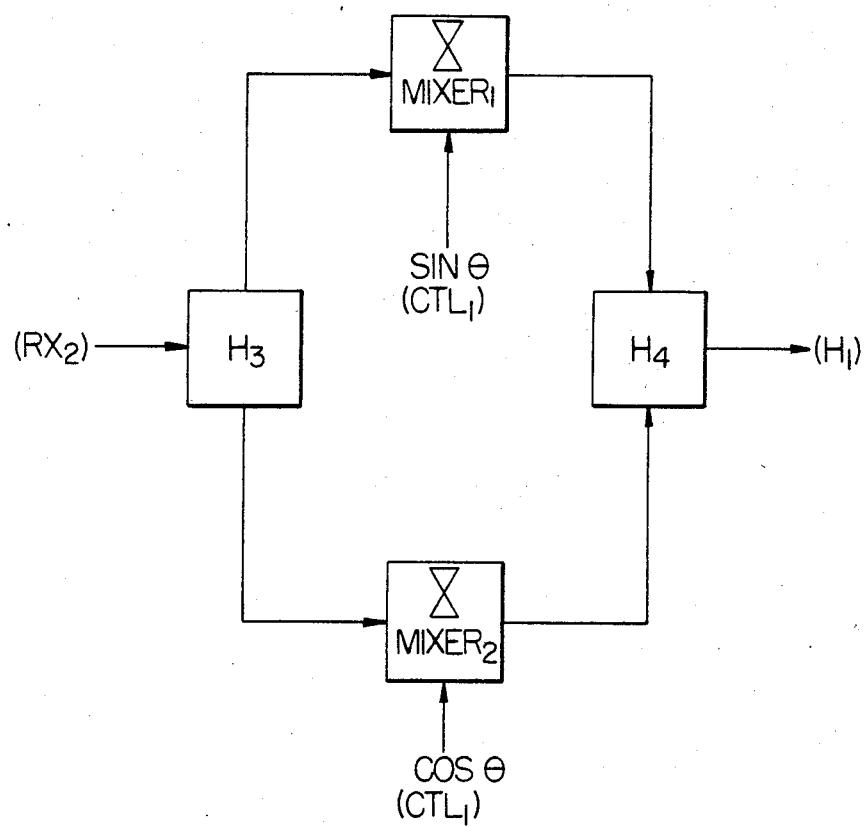
FIG. 6 is a block diagram of an endless phase shifter used in the embodiment of the present invention.

The endless phase shifter EPS comprises, for example, two double balance mixers $mixer_1$ and $mixer_2$ (FIG. 6), a 90° hybrid combiner, $H_3$ or $H_4$ and a 0° hybrid combiner $H_4$ or $H_3$ and is controlled by analog signals, i.e., $\sin\theta$ and $\cos\theta$, transmitted from the control circuit CTL. The direction of the phase, i.e., the vector of the phase, is shifted by the endless phase shifter EPS to minimize amplitude deviation in the predetermined IF bandwidth based on the analog signal used as the control signal transmitted from the control circuit CTL. Each of the double balance mixers is a so-called modulator and comprises transformers and a plurality of diodes formed in a bridge structure for processing one of the received signals.

As mentioned above, the hybrid combiner $H_1$, preferably a 0° hybrid combiner, combines the output of the receiver $RX_1$ with the output of the endless phase shifter EPS. The combined output is applied to the automatic gain control amplifier AMP via the band-pass filter BPF. The band-pass filter BPF is provided in order to cut the interference and the noise contained in the combined output. The automatic gain control amplifier AMP is provided in order to obtain a constant absolute value of output voltage using an automatic gain control circuit.

The output of the automatic gain control amplifier AMP is applied to the hybrid distributor $H_2$ and the controlled voltage is used to discriminate the received level. The hybrid distributor $H_2$ is preferably a 0° hybrid combiner connected to distribute or split, as mentioned above, the output of the automatic gain control amplifier AMP into two intermediate frequency outputs, i.e., the main output and the sub output. The main output is applied to the next stage, and the sub output is applied to the signal mixer MIX.

The voltage controlled oscillator VCO generates a reference signal having sequential frequencies in the intermediate frequency bandwidth. The sequential output of the voltage controlled oscillator VCO is mixed with the sub output transmitted from the hybrid distributor $H_2$ in the signal mixer MIX. The voltage controlled oscillator VCO can be any conventional type voltage controlled oscillator.

Figure 4:
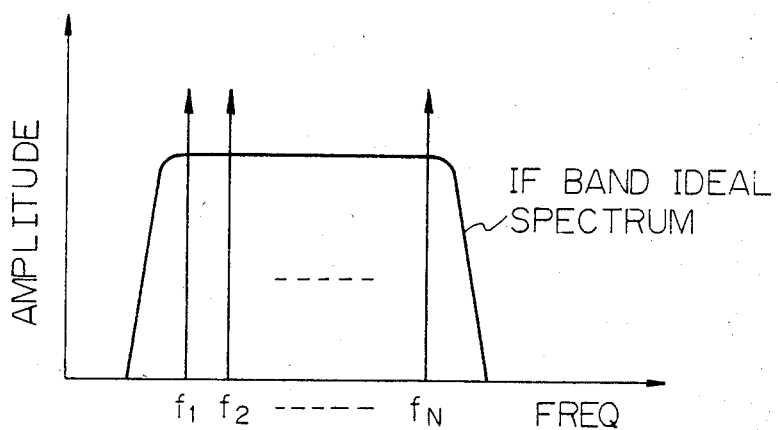
FIG. 4 is a graph for explaining mixing with the intermediate frequency at sequential frequencies in the predetermined intermediate frequency bandwidth for the ideal spectrum according to the embodiment of the present invention shown in FIG. 3.

As illustrated in FIG. 4, the reference signal with sequential frequencies $f_1, f_2 \ldots f_N$ generated from the voltage controlled oscillator VCO is mixed with the received frequency spectrum in the intermediate frequency bandwidth, i.e., the sub output frequency spectrum. The obtained differential frequency between each sequential frequency and the received spectrum is detected by the detector DT. The detected output, which is approximately D.C. voltage, is applied to the control circuit CTL.

The control circuit CTL controls the voltage of input to the voltage controlled oscillator VCO to generate the sequential frequencies under the control of a microprocessor provided therein using a predetermined control program. This control circuit CTL is the same as the control circuit illustrated in FIG. 1, except for the additional microprocessor used as the voltage control circuit for controlling the voltage controlled oscillator VCO.

The control circuit CTL also controls the endless phase shifter EPS based on the detection of the deviation obtained from the detected output of the detector DT. These detections are performed by the microprocessor and the memory based on a comparison of a predetermined voltage value with the detected voltage value or a comparison of a standard amplitude in the intermediate frequency bandwidth with the detected output level. These controls are performed after analog/digital conversion. The output of the control circuit CTL contains analog signals, for example, $\sin \theta$ and $\cos \theta$, after digital/analog conversion.

When it is obvious, based on the controlled voltage obtained from the automatic gain control amplifier AMP, that the received electric field level is extremely low due to poor atmospheric conditions, the control procedure of the control circuit CTL is changed to the maximum amplitude level composition method. Namely, in this case, the control circuit CTL controls the endless phase shifter EPS by using the maximum amplitude level composition method to secure the necessary reception level for demodulation at the next stage.

Consequently, the endless phase shifter EPS is controlled by the analog signals transmitted from the control circuit to maximumize the reception level obtained by the controlled voltage of the automatic gain control amplifier AMP.

Figure 5A:
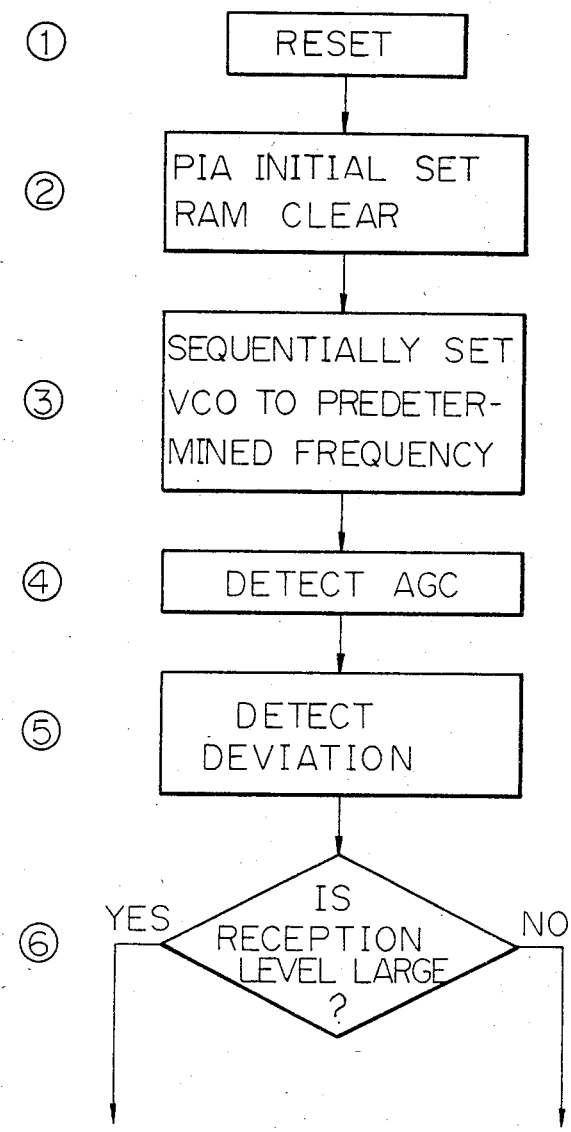
FIG. 5A and FIG. 5B are flowcharts of control procedures using a microprocessor provided in a control circuit of FIG. 3.
Figure 5B:
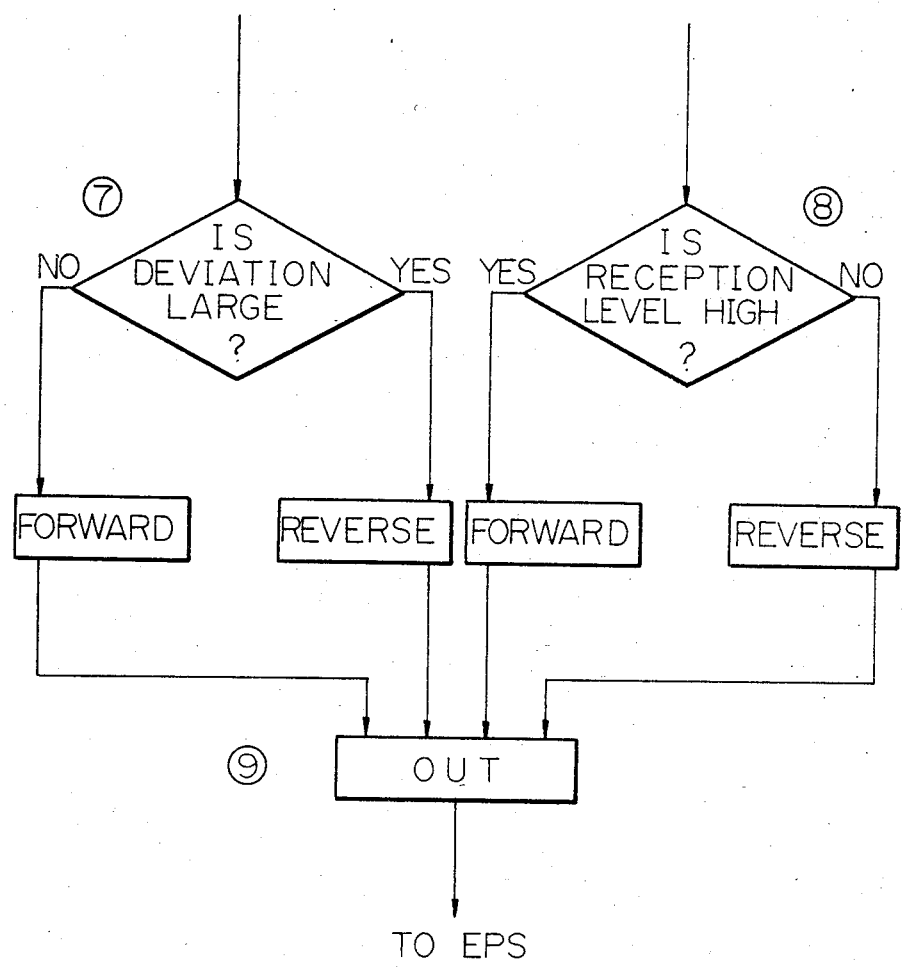

FIG. 5A and FIG. 5B are flowcharts of the basic control procedure in the control circuit CTL for obtaining the optimum intermediate frequency output. As explained above, this control procedure is performed automatically by using the microprocessor provided in the control circuit CTL.

Referring to FIGS. 5A and 5B when the control circuit CTL is reset by a manual operation (step 1), a peripheral interface adapter PIA (not shown) is initially set and a random access memory RAM (not shown) is cleared (step 2). The control circuit CTL sequentially sets the voltage controlled oscillator VCO for generating the predetermined sequential frequency ($f_1$ to $f_N$) based on the detected output of the detector DT (step 3). Next, the control circuit CTL detects the controlled voltage of the automatic gain control amplifier AMP (step 4) and detects the deviation between the standard amplitude in the intermediate frequency bandwidth and the detected output of the detector DT for each frequency $f_1, f_2$, to $f_N$ (step 5). The control circuit CTL compares the predetermined electric field level stored in the memory with the received electric field level obtained by the controlled voltage of the automatic gain control amplifier AMP (step 6) and checks to see if the deviation in the intermediate frequency bandwidth is large or small (step 7) compared with the former step if the reception level is large at step 6. If the reception level is small at step 6, the control circuit CTL again checks to see again if the reception level is high or low (step 8) compared with the former step 6. The control circuit CTL outputs these control signals indicating the rotation of the vector of phase in the forward or reverse direction using the analog signals for the endless phase shifter EPS.

I claim:

1. An apparatus for space-diversity reception of microwaves transmitted from a remote transmitting station, comprising:

first and second receiving means for receiving the microwaves transmitted from the remote transmitting station as received microwaves;

first and second amplifying means, operatively connected to said first and second receiving means, respectively, for amplifying and detecting the received microwaves using a predetermined detection method to produce detected intermediate frequency outputs having a phase;

phase shifting means, operatively connected to said second amplifying means, for shifting the phase of the detected intermediate frequency output obtained by said second amplifying means to produce an output;

combining means, operatively connected to said first amplifying means and said phase shifting means, for combining the outputs of said first amplifying means and said phase shifting means into an amplified output;

splitting means, electrically connected to said combining means, for splitting the amplified output into a main output and a sub output;

generaing means for generating a predetermined sequential frequency in an intermediate frequency bandwidth under the control of an input voltage;

mixing means, operatively connected to said splitting means and said generating means, for mixing the sub output with the sequential frequency output from said generating means to produce a mixed signal and for detecting the mixed signal to produce detected outputs; and controlling means for controlling said phase shifting means to minimize amplitude deviation of the main output based on the detected outputs of said mixing means and changing the input voltage for said generating means.

2. An apparatus as claimed in claim 1, wherein said first and second receiving means comprise parabolic antennas.

3. An apparatus as claimed in claim 1, wherein said first and second amplifying means comprise heterodyne detection receiving circuits.

4. An apparatus as claimed in claim 1, wherein said phase shifting means comprises:
at least two double balance mixers operatively connected to said controlling means and controlled by an analog signal; and
at least 90° and 0° hybrid combiners operatively connected to said controlling means.

5. An apparatus as claimed in claim 1, wherein said combining means comprises a first 0° hybrid combiner operatively connected to said first amplifying means, said phase shifting means and said splitting means, and wherein said splitting means comprises a second 0° hybrid combiner operatively connected to said combining means and said mixing means.

6. An apparatus as claimed in claim 1, wherein said generating means comprises a voltage controlled oscillator operatively connected to said mixing means and said controlling means.

7. An apparatus as claimed in claim 6, wherein said controlling means comprises a microprocessor, operatively connected to said phase shifting means, said generating means and said mixing means, for controlling the input voltage to control said voltage controlled oscillator.

8. An apparatus as claimed in claim 1, wherein said controlling means comprises a microprocessor, operatively connected to said phase shifting means, said generating means and said mixing means, for controlling the input voltage of said generating means.

9. An apparatus as claimed in claim 1, wherein said mixing means comprises:
a mixer, operatively connected to said splitting means and said generating means, for mixing the sub output and the predetermined sequential frequency into a mixed signal;
a filter, operatively connected to said mixer, for filtering the mixed signal and providing a filtered signal; and
a detector, operatively connected to said filter and said controlling means, for detecting the filtered signal.

10. An apparatus as claimed in claim 9, wherein said controlling means comprises a microprocessor, operatively connected to said phase shifting means, said generating means and said mixing means, for controlling the input voltage of said generating means.

11. An apparatus as claimed in claim 1, further comprising an automatic gain control amplifier, operatively connected to said combining means, said splitting means and said controlling means, for detecting a reception level based on a controlled voltage obtained by said automatic gain control amplifier, said controlling means controlling said phase shifting means to maximize the reception level when the reception level is lower than a predetermined reception level.

12. A method for space-diversity reception of microwaves transmitted from a remote transmitting station, comprising the steps of:
(a) receiving the microwaves, transmitted from the remote transmitting station, as received microwaves, using two parabolic antennas;
(b) amplifying and detecting the received microwaves by two receivers using a heterodyne detection receiving method to produce detected intermediate frequency outputs, each having a phase;
(c) shifting the phase of the detected intermediate frequency output of one of the receivers by using an endless phase shifter to produce a shifted output;
(d) combining the shifted and detected intermediate frequency outputs from the endless phase shifter and the other of the receivers, respectively, by using a hybrid combiner to produce a combined output;
(e) splitting the combined output transmitted from the hybrid combiner into a main output and a sub output using a hybrid distributor;
(f) generating a predetermined sequence of frequencies in an intermediate frequency bandwidth by using a voltage controlled oscillator;
(g) mixing the sub output transmitted from the hybrid distributor with the sequential frequency by using a signal mixer to produce a mixed signal;
(h) detecting the mixed signal after filtering with a low pass filter by using a detector to produce detected outputs; and
(i) controlling the endless phase shifter to minimize amplitude deviation of the main output, based on the detected outputs provided by the detector, by using a microprocessor.

13. A method as claimed in claim 12, wherein said shifting in step (c) is performed by analog signals including a rotation angle of the phase transmitted from the microprocessor.

14. A method as claimed in claim 12, wherein said controlling in step (i) is performed by a predetermined control program stored in the microprocessor.

15. A method as claimed in claim 12, wherein said controlling in step (i) is performed based on a deviation between a standard amplitude of an intermediate frequency spectrum and the detected outputs obtained by the detector.

16. A method as claimed in claim 12, further comprising the steps of:
(j) detecting a reception level based on a controlled voltage using an amplifier with automatic gain control; and (k) detecting the reception level based on the controlled voltage obtained by the amplifier, wherein said controlling further comprises controlling the endless phase shifter to maximize the reception level when the reception level is lower than a predetermined level.

17. An apparatus for a space-diversity receiving system which receives microwaves, each of the microwaves corresponding to a single transmit signal transmitted from a remote transmitting station, said system comprising:

signal processing means, operatively connected to receive the microwaves, for phase shifting at least one of the microwaves to produce a processed signal, for combining the processed signal with any of the other microwaves to produce a combined signal and for splitting the combined signal into a main output and sub-output;

generating means for generating a reference frequency signal;

deviation detection means, operatively connected to said signal processing means and said generating means, for mixing the sub-output and the reference frequency signal to produce a mixed signal and for detecting the mixed signal to produce a detected signal; and controlling means, operatively connected to said signal processing means, said generating means and said deviation detection means, for controlling the phase shifting of the at least one of the microwaves by said signal processing means and the frequency of the reference signal generated by said generating means in dependence upon the detected signal.

18. An apparatus as claimed in claim 17, wherein said deviation detection means comprises:

mixer means, operatively connected to said signal processing means and said generating means, for mixing the sub-output and the reference frequency signal; and detection means, operatively connected to said mixer means and said controlling means, for detecting a deviation between the reference signal and the sub-output in the mixed signal to produce the detected signal, and wherein said controlling means controls the phase shifting of the at least one of the microwaves to minimize the deviation indicated by the detected signal.

* * * * *